United States Patent
Kawamura

[11] 4,046,459
[45] Sept. 6, 1977

[54] RETROFOCUS WIDE ANGLE OBJECTIVE LENS SYSTEM

[75] Inventor: Naoto Kawamura, Inagi, Japan
[73] Assignee: Canon Kabushiki Kaisha, Tokyo, Japan
[21] Appl. No.: 607,915
[22] Filed: Aug. 26, 1975
[30] Foreign Application Priority Data
  Sept. 4, 1974   Japan ................................ 49-101709
[51] Int. Cl.$^2$ ............................................. G02B 13/04
[52] U.S. Cl. .................................................. 350/214
[58] Field of Search ........................................ 350/214
[56] References Cited
    U.S. PATENT DOCUMENTS
  3,507,559   4/1970   Mori .................................. 350/214
  3,856,385  12/1974   Takahashi ........................... 350/214
  3,874,770   4/1975   Skimizu .............................. 350/214

*Primary Examiner* — John K. Corbin
*Assistant Examiner* — Conrad Clark
*Attorney, Agent, or Firm* — Toren, McGeady and Stanger

[57] ABSTRACT

A retrofocus wide angle objective lens system of seven air-spaced lenses, the first and second lenses, counting in the order of the entrant light beam, being negative meniscus lenses of forward convexity, the third lens being a positive lens, the fourth lens being a bi-convex lens, the fifth lens being a bi-concave lens, and the sixth and seventh lenses being positive lenses. The third and fourth lenses are separated by a large axial air space, and the third lens has a larger diameter than the fourth lens.

8 Claims, 12 Drawing Figures

SPHERICAL ABERRATION   ASTIGMATISM   DISTORTION

SPHERICAL ABERRATION   ASTIGMATISM   DISTORTION

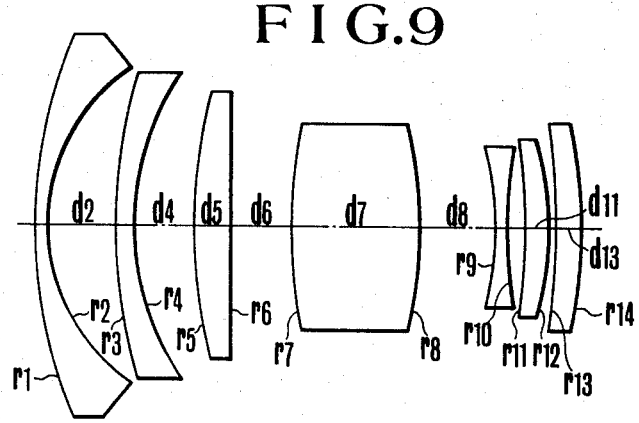
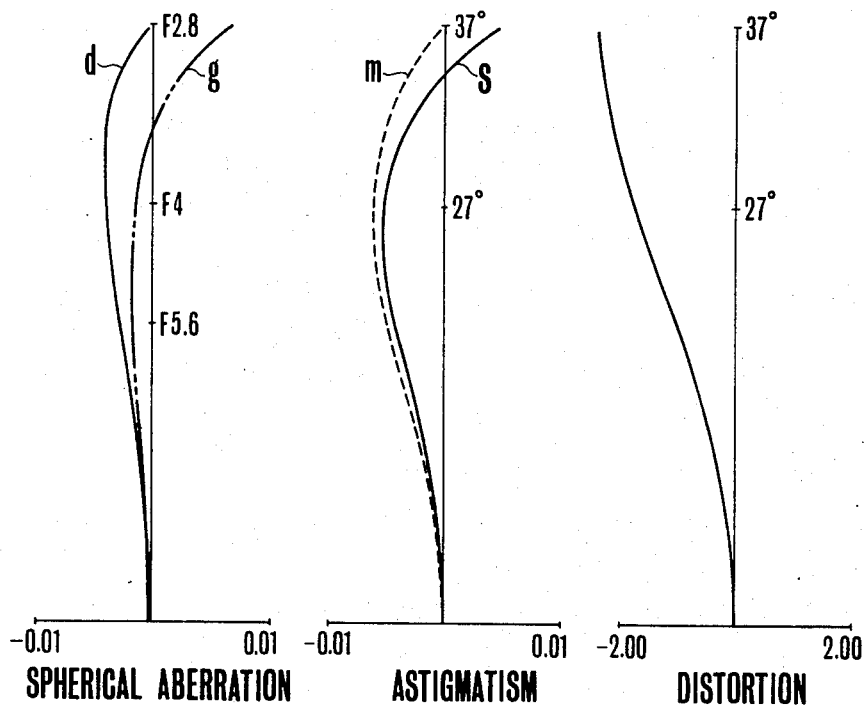

RETROFOCUS WIDE ANGLE OBJECTIVE LENS SYSTEM

BACKGROUND OF THE INVENTION

1. Field of the Invention

This invention relates to a compact retrofocus wide angle objective lens system of a long back-focal length adapted for use with a single lens reflex camera.

2. Description of the Prior Art

In general, retrofocus objective lenses are configured to have a negatively refracting front lens assembly and a positively refracting rear lens assembly for the purpose of facilitating increase in the back-focal length thereof. This type of retrofocus objectives has been characterized by the difficulty of achieving a good standard of aberration correction because of the asymmetric configuration of the complete lens system. Further, in this type of objective, an increase in the overall physical length resulting from, for example, decreasing the number of lens components constituting the complete lens system, or the diameter of the front lens component, makes it more difficult to compensate for various aberrations.

SUMMARY OF THE INVENTION

The general object of the present invention is to provide an improved retrofocus lens system of the above-described character yielding a back focal length as high as 1.28 times the overall focal length of the complete system with as small as seven air-spaced lens components and having a relative aperture 1 : 2.8 with a field angle of at least 75° with limitation of the overall length of the lens system to less than 1.83 times the overall focal length thereof, while nevertheless achieving a very high standard of correction of various aberrations otherwise encountered by limitation of the overall dimensions of the lens system to such a minimum.

BRIEF DESCRIPTION OF THE DRAWINGS

FIG. 9 is an axial sectional view of a lens according to a third embodiment of the invention.

FIGS. 10, 11 and 12 are curves of the spherical aberration, astigmatism and distortion respectively for the lens of FIG. 9.

DETAILED DESCRIPTION OF THE PREFERRED EMBODIMENTS

Figure 1:
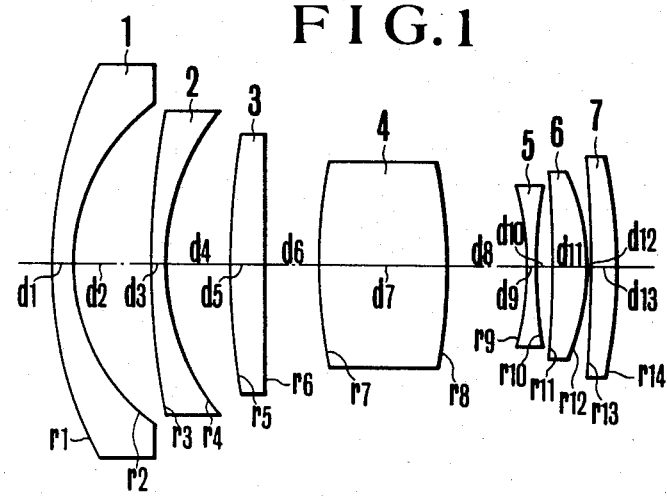
FIG. 1 is an axial sectional view of a retrofocus wide angle objective lens according to one embodiment of the invention.
Figures 2, 3, 4:
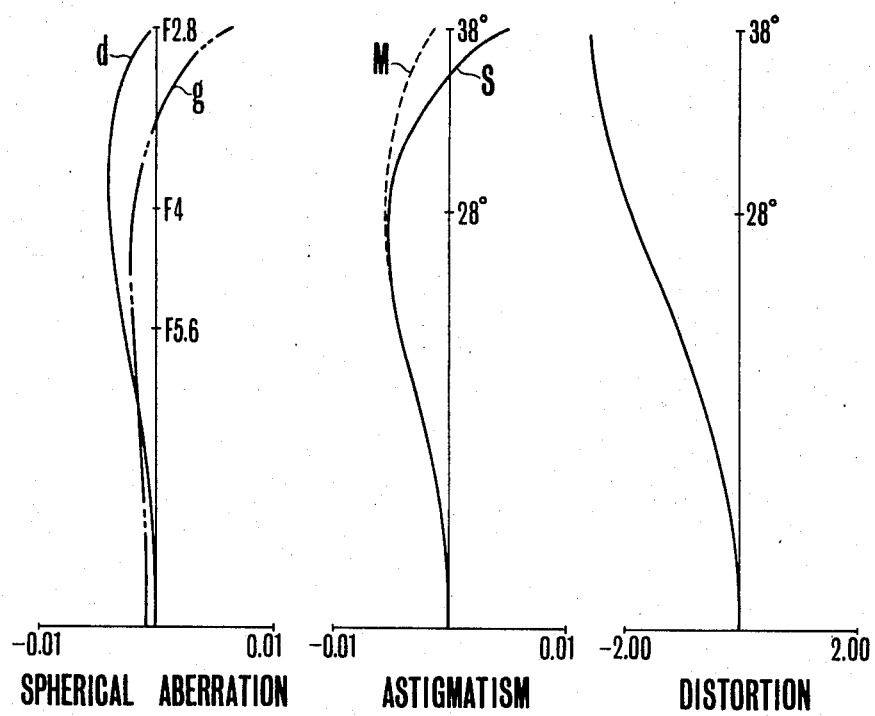
FIGS. 2, 3 and 4 are curves of the spherical aberration, astigmatism and distortion respectively for the lens of FIG. 1.
Figure 5:
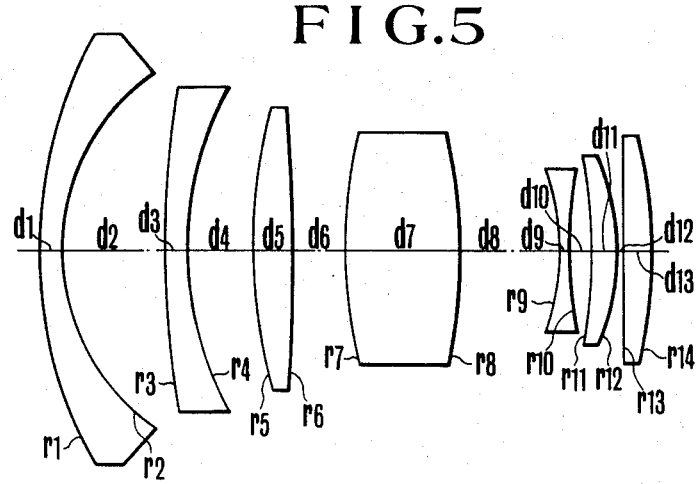
FIG. 5 is an axial sectional view of a lens according to a second embodiment of the invention.
Figures 6, 7, 8:
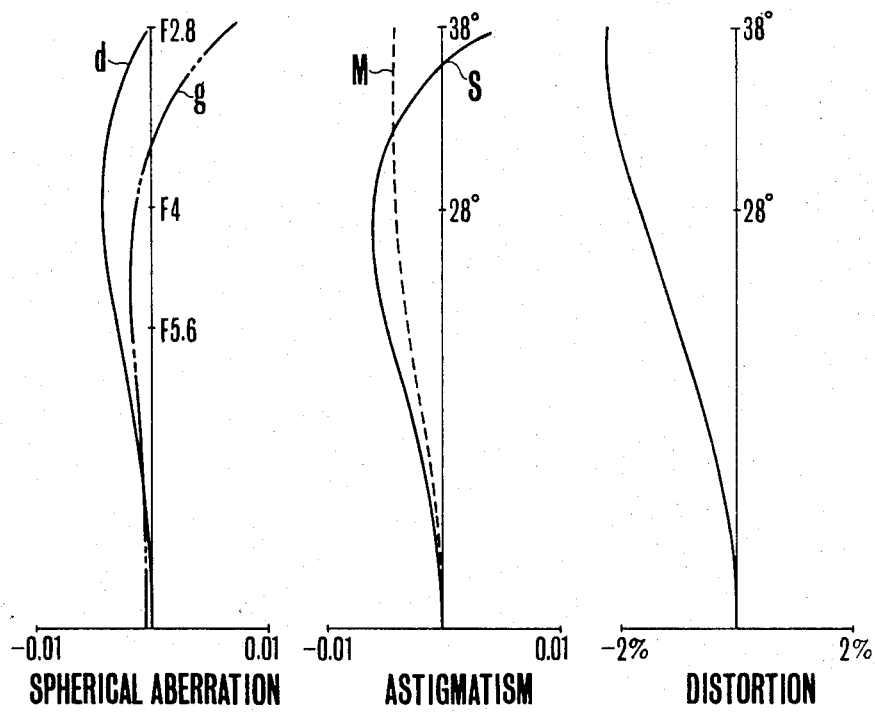
FIGS. 6, 7 and 8 are curves of the spherical aberration, astigmatism and distortion respectively for the lens of FIG. 5.

As shown in FIGS. 1, 5 and 9, a retrofocus wide angle objective lens system of the present invention is characterized in comprising seven optically aligned lens elements, the first and second lens elements counting in the order of the entrant light beam being negative meniscus singlet lenses of forward convexity, the third lens element being a positive singlet lens, the fourth lens element being a bi-convex singlet lens, the fifth lens element being a bi-concave singlet lens, and the sixth and seventh lens elements being positive singlet lenses. If desired, the fourth, fifth and sixth lenses may be individual cemented lenses. For facilitating minimization of the overall dimensions of the lens system, the third and fourth lens elements are separated by a large axial air space as will be described in more detail later, and, accordingly, the diameter of the third lens element is considerably larger than that of the fourth lens element.

A conventionally well-accepted technique for reducing the bulk and size of a complete objective lens is to increase the powers of the individual lens components with decrease in axial air spaces between the successive lens components. When this technique is employed in designing such retrofocus objectives as comprising a divergent front lens assembly and a convergent rear lens assembly, an important problem arising therein is to compensate residual aberrations introduced by the front lens assembly in a manner to achieve a high standard of correction of the image aberrations without involving any great increase in the overall dimensions of the complete objective.

The present invention provides a retrofocus wide angle objective lens with seven lens elements of which the first and second lens elements constitute a divergent front lens assembly and with limitation of the overall dimensions of the complete objective to a minimum by utilizing the above mentioned size reduction technique, whereas residual spherical aberration and field curvature introduced by the front lens assembly are well compensated for. As is known in the art, good compensation for residual aberration is more effectively made at a lens located nearer the lens which contributes to the lens system the residual aberrations. For this reason, the third lens element following the divergent front lens assembly to compensate residual aberrations introduced thereby is required to be located as near to the second lens element as possible. It is desirable to separate the third and fourth lens elements from each other by an axial air space $d_6$ larger than the axial thickness $d_5$ of the third lens element, as the second and lens elements are separated from each other by a small axial space.

While the above mentioned feature is generally applicable to any retrofocus objective lens comprising divergent front and convergent rear lens assemblies, the objective is characterized, for purposes of assisting towards improvement of various aberrations otherwise encountered with such size limitation by the following features in combination:

a. $0.6 < d_6/d_4 < 1.0$
b. $0.68f < \gamma_4 < 0.9f$
c. $7.0f < |\gamma_6|$
d. $N_3 > 1.72; V_3 < 40$
e. $0.95f < |\gamma_8| < 1.5f; \gamma_8 < 0$ wherein $f$ is the overall focal length of the complete objective; $d_4$ and $d_6$ are the axial air separations between the second and third lens elements and between the third and fourth lens elements respectively; $\gamma_4$, $\gamma_6$ and $\gamma_8$ are the radii of curvature of the rear refracting surfaces of the second, third and fourth lens elements respectively; and $N_3$ and $V_3$ are the refractive index and Abbe number of a glass respectively from which the third lens element is made.

Condition (a) is a compromise between the requirements of limiting to a minimum the dimensions of the complete objective both in the axial and in the radial directions, and of compensating the residual spherical aberration and field curvature introduced by the first and second lens elements to a modest degree under the situation that the third lens element is located as far from the fourth lens element as possible for the purpose of effecting the limitation of the dimensions. When the lower limit namely, 0.6 is violated, residual spherical aberration and field curvature ascribable to the third lens element become so serious that various residual aberrations ascribable to the first and second lens elements can not be compensated for with the result of a low standard of correction of the image aberrations. When the upper limit, namely, 1.0 is violated, the diverging function of the first and second lens elements is weakened by the converging function of the third lens element. Consequently, the diverging powers of the first and second lens elements must be increased, or otherwise the desired back focal length could not be retained. As the powers of the first and second lens elements are increased, various aberrations ascribable thereto are increased in a non-linear manner to such values as cannot be balanced out by the suitable design of the remaining lens elements.

Condition (b) assists in adjusting the balance in this respect. When the lower limit is violated, this refracting surface $\gamma_4$ produces large aberrations which can not be balanced out by the suitable design of the remaining lens elements. When the upper limit, namely, 0.94 is violated, residual aberration ascribable to this surface is decreased with decrease in the diverging effect. In order to obtain an equivalent diverging effect, therefore, the axial air separation $d_4$ between the second and third lens elements must be increased with sacrificing an increase in the size of the complete objective and permitting an adverse effect on the balance of the nature described above.

Conditions (c) and (d) are concerned particularly with lateral chromatic aberration correction. When the absolute value of the radius of curvature of the rear surface $\gamma_6$ of the third lens element is smaller than $7.0f$, the lateral chromatic aberration is over-corrected when $\gamma_6 < 0$, and is under-corrected when $\gamma_6 > 0$. Condition (d) facilitates correction of lateral chromatic aberration along with spherical aberration and field curvature.

Condition (e) assists towards correction of spherical aberration, coma and distortion. When the lower limit, namely $0.95f$ is violated, the rear surface of the fourth lens element contributes to the system large aberration with the result of over-compensated coma and distortion. When the upper limit, namely, $1.5f$ is violated, effective compensation cannot be made because of the production of small aberration. Particularly in the spherical aberration and distortion, under-compensation will be resulted. In other words, condition (e) provides a compromise in respect of the good balance of the image aberrations.

According to a further feature of the present invention, the objective may be constructed from a forwardly convex lens as the third lens element of positive power either independently of or in combination with a rearwardly convex lens as the seventh lens element of positive power. In addition to this feature, the objective is characterized in that the axial thickness $d_9$ of the fifth lens element is related to the axial air separation $d_{10}$ between the fifth and sixth lens elements as $d_9 < d_{10}$.

Numerical date for three preferred embodiments of the retrofocus wide angle objective lens system according to the present invention are given in Tables 1, 3 and 5 in which $\gamma_1, \gamma_2 \ldots$ designate the radii of curvature of the individual surfaces counting from the front, the negative sign indicating that the surface is concave to the front; $d_1, d_2 \ldots$ designate the axial thicknesses or air separations between the successive two surfaces; $N_1$, $N_2 \ldots$ designate the refractive indices for the sodium $d$-line of the spectrum of the materials from which the various elements of the objective are made; and $\nu_1, \nu_2 \ldots$ designate the Abbe numbers of the corresponding materials. Seidel aberration coefficients for the lens systems of Tables 1, 3 and 5 are given in Tables 2, 4 and 6 respectively, in which SA designates the spherical aberration coefficients for the individual surfaces; CM designates the coma coefficients; AS designates the astigmatism coefficients; PT designates the Petzval sums; and DS designates the distortion coefficients.

Table 1

(for Fig.1)

$f = 1$;  F 2.8;  $\omega = 38°$

| | | | | | | | |
|---|---|---|---|---|---|---|---|
| $\gamma_1 =$ | 1.1726 | $d_1 =$ | 0.0632 | $N_1 =$ | 1.61117 | $\nu_1 =$ | 55.9 |
| $\gamma_2$ | 0.5675 | $d_2$ | 0.2290 | | | | |
| $\gamma_3$ | 1.9078 | $d_3$ | 0.0526 | $N_2$ | 1.56965 | $\nu_2$ | 49.4 |
| $\gamma_4$ | 0.6840 | $d_4$ | 0.1909 | | | | |
| $\gamma_5$ | 1.8065 | $d_5$ | 0.1053 | $N_3$ | 1.74950 | $\nu_3$ | 35.2 |
| $\gamma_6$ | 13.2025 | $d_6$ | 0.1510 | | | | |
| $\gamma_7$ | 1.1998 | $d_7$ | 0.4009 | $N_4$ | 1.71300 | $\nu_4$ | 53.9 |
| $\gamma_8$ | −1.3263 | $d_8$ | 0.2315 | | | | |
| $\gamma_9$ | −0.7066 | $d_9$ | 0.0351 | $N_5$ | 1.76182 | $\nu_5$ | 26.6 |
| $\gamma_{10}$ | 1.7226 | $d_{10}$ | 0.0386 | | | | |
| $\gamma_{11}$ | −3.0411 | $d_{11}$ | 0.1088 | $N_6$ | 1.7725 | $\nu_6$ | 49.7 |
| $\gamma_{12}$ | −0.6435 | $d_{12}$ | 0.0070 | | | | |
| $\gamma_{13}$ | −4.6120 | $d_{13}$ | 0.0912 | $N_7$ | 1.7725 | $\nu_7$ | 49.7 |
| $\gamma_{14}$ | −1.2212 | | | | | | |

$\Sigma d = 1.7050$  Back focal length $= 1.2807$ $$\frac{d_6}{d_4} = 0.7910$$

Table 2

| Surface No. | SA | CM | AS | PT | DS |
|---|---|---|---|---|---|
| 1 | 0.146035 | 0.072971 | 0.036463 | 0.323504 | 0.179870 |
| 2 | −3.675033 | 0.665763 | −0.120608 | −0.668456 | 0.142946 |
| 3 | 0.613187 | 0.242821 | 0.096157 | 0.190228 | 0.113408 |
| 4 | −8.755002 | 0.570447 | −0.037168 | −0.530591 | 0.036993 |
| 5 | 4.305823 | 0.614058 | 0.087572 | 0.237154 | 0.046309 |
| 6 | −0.365293 | −0.270320 | −0.200039 | −0.032449 | −0.172043 |
| 7 | 3.713808 | 0.791168 | 0.168546 | 0.346934 | 0.109815 |
| 8 | 5.199990 | −2.024604 | 0.788275 | 0.313842 | −0.429107 |
| 9 | 8.839787 | 1.945718 | −0.428270 | −0.611967 | 0.228966 |
| 10 | −2.044805 | −1.356149 | −0.899421 | −0.251018 | −0.762990 |
| 11 | 0.108422 | 0.219507 | 0.444402 | −0.143312 | 0.609570 |
| 12 | 5.819640 | −0.823215 | 0.116448 | 0.677296 | −0.112279 |
| 13 | −0.209745 | 0.198654 | −0.188150 | −0.094499 | 0.267704 |
| 14 | 5.050752 | −0.844388 | 0.141166 | 0.356891 | −0.083265 |
| Total | 1.067991 | 0.002431 | 0.005370 | 0.113556 | 0.175897 |

Table 3

(for Fig. 5)

$f = 1 \quad F\,2.8 \quad \omega = 38°$

| | | | | | | | |
|---|---|---|---|---|---|---|---|
| $\gamma_1 =$ | 1.3064 | $d_1 =$ | 0.0632 | $N_1 =$ | 1.61117 | $\nu_1 =$ | 55.9 |
| $\gamma_2$ | 0.6109 | $d_2$ | 0.3152 | | | | |
| $\gamma_3$ | 3.7622 | $d_3$ | 0.0526 | $N_2$ | 1.60729 | $\nu_2$ | 49.3 |
| $\gamma_4$ | 0.7757 | $d_4$ | 0.2100 | | | | |
| $\gamma_5$ | 1.7619 | $d_5$ | 0.1053 | $N_3$ | 1.72342 | $\nu_3$ | 38.0 |
| $\gamma_6$ | −9.1853 | $d_6$ | 0.1500 | | | | |
| $\gamma_7$ | 1.0840 | $d_7$ | 0.3627 | $N_4$ | 1.60311 | $\nu_4$ | 60.7 |
| $\gamma_8$ | −1.3336 | $d_8$ | 0.2910 | | | | |
| $\gamma_9$ | −0.6365 | $d_9$ | 0.0351 | $N_5$ | 1.74077 | $\nu_5$ | 27.8 |
| $\gamma_{10}$ | 1.8877 | $d_{10}$ | 0.0491 | | | | |
| $\gamma_{11}$ | −2.5630 | $d_{11}$ | 0.0947 | $N_6$ | 1.69350 | $\nu_6$ | 53.3 |
| $\gamma_{12}$ | −0.6112 | $d_{12}$ | 0.0070 | | | | |
| $\gamma_{13}$ | −26.827 | $d_{13}$ | 0.0912 | $N_7$ | 1.69350 | $\nu_7$ | 53.3 |
| $\gamma_{14}$ | −1.1736 | | | | | | |

$\Sigma d = 1.8271$ Back focal length $= 1.2807$ $$\frac{d_6}{d_4} = 0.714$$

Table 4

| Surface No. | SA | CM | AS | PT | DS |
|---|---|---|---|---|---|
| 1 | 0.105587 | 0.059938 | 0.034024 | 0.290356 | 0.184139 |
| 2 | −3.066142 | 0.670053 | −0.146429 | −0.620868 | 0.167679 |
| 3 | 0.295980 | 0.192558 | 0.125274 | 0.100422 | 0.146833 |
| 4 | −9.455414 | 0.709214 | −0.053195 | −0.487021 | 0.040519 |
| 5 | 5.935596 | 0.492389 | 0.040846 | 0.238226 | 0.023150 |
| 6 | −0.066984 | −0.105458 | −0.166028 | 0.045696 | −0.189446 |
| 7 | 3.871075 | 0.642769 | 0.106728 | 0.347024 | 0.075343 |
| 8 | 5.370527 | −2.129211 | 0.844152 | 0.282080 | −0.446509 |
| 9 | −10.436956 | 2.066115 | −0.409011 | −0.668528 | 0.213311 |
| 10 | −1.922981 | −1.311824 | −0.894904 | −0.225415 | −0.764202 |
| 11 | 0.079507 | 0.181560 | 0.414605 | −0.159764 | 0.581946 |
| 12 | 5.156481 | −0.705360 | 0.096487 | 0.669966 | −0.104844 |
| 13 | −0.026222 | 0.057400 | −0.125648 | −0.015263 | 0.308455 |
| 14 | 5.125056 | −0.776300 | 0.117587 | 0.348893 | −0.070659 |
| Total | 0.965109 | 0.043842 | −0.015511 | 0.145805 | 0.165657 |

Table 5

(for Fig. 9)

$f = 1 \quad F\,2.8 \quad \omega = 37°$

| | | | | | | | |
|---|---|---|---|---|---|---|---|
| $\gamma_1 =$ | 1.1756 | $d_1 =$ | 0.0421 | $N_1 =$ | 1.61117 | $\nu_1 =$ | 55.9 |
| $\gamma_2$ | 0.5588 | $d_2$ | 0.2132 | | | | |
| $\gamma_3$ | 1.9760 | $d_3$ | 0.0351 | $N_2$ | 1.56965 | $\nu_2$ | 49.4 |
| $\gamma_4$ | 0.6857 | $d_4$ | 0.1855 | | | | |
| $\gamma_5$ | 1.8555 | $d_5$ | 0.1053 | $N_3$ | 1.83400 | $\nu_3$ | 37.2 |
| $\gamma_6$ | 19.7733 | $d_6$ | 0.1810 | | | | |
| $\gamma_7$ | 1.2309 | $d_7$ | 0.3879 | $N_4$ | 1.71300 | $\nu_4$ | 53.9 |
| $\gamma_8$ | −1.3096 | $d_8$ | 0.2258 | | | | |
| $\gamma_9$ | −0.7213 | $d_9$ | 0.0351 | $N_5$ | 1.76182 | $\nu_5$ | 26.6 |
| $\gamma_{10}$ | 1.6736 | $d_{10}$ | 0.0421 | | | | |
| $\gamma_{11}$ | 2.7127 | $d_{11}$ | 0.0877 | $N_6$ | 1.77250 | $\nu_6$ | 49.7 |
| $\gamma_{12}$ | −0.6361 | $d_{12}$ | 0.0070 | | | | |
| $\gamma_{13}$ | −3.6831 | $d_{13}$ | 0.0877 | $N_7$ | 1.77250 | $\nu_7$ | 49.7 |
| $\gamma_{14}$ | −1.1511 | | | | | | |

$\Sigma d = 1.6355$ Back focal length $= 1.2807$

Table 5-continued (for Fig. 9)

$f = 1 \quad F\,2.8 \quad \omega = 37°$ $$\frac{d_6}{d_4} = 0.9757$$

Table 6

| Surface No. | SA | CM | AS | PT | DS |
|---|---|---|---|---|---|
| 1 | 0.144897 | 0.077862 | 0.041840 | 0.322662 | 0.195868 |
| 2 | −4.045723 | 0.710444 | −0.124757 | −0.678829 | 0.141113 |
| 3 | 0.638314 | 0.250461 | 0.098276 | 0.183665 | 0.110628 |
| 4 | −9.173934 | 0.685262 | −0.051187 | −0.529290 | 0.043360 |
| 5 | 4.655788 | 0.600873 | 0.077548 | 0.245076 | 0.041638 |
| 6 | −0.297485 | −0.244292 | −0.200610 | −0.022998 | −0.183625 |
| 7 | 3.425532 | 0.764424 | 0.170585 | 0.338162 | 0.113529 |
| 8 | 5.714320 | −2.166275 | 0.821226 | 0.317817 | −0.431807 |
| 9 | −9.155042 | 2.047703 | −0.458008 | −0.599468 | 0.236525 |
| 10 | −2.005424 | −1.309790 | −0.855454 | −0.258371 | −0.727466 |
| 11 | 0.066322 | 0.162210 | 0.396732 | −0.160663 | 0.577376 |
| 12 | 5.980070 | −0.913598 | 0.139574 | 0.685112 | −0.125990 |
| 13 | −0.272288 | 0.232108 | −0.197858 | −0.118330 | 0.269530 |
| 14 | 5.459993 | −0.930889 | 0.158710 | 0.378608 | −0.091609 |
| Total | 1.135339 | −0.036496 | 0.016616 | 0.103153 | 0.169071 |

What is claimed is:

1. A retrofocus wide angle objective lens system comprising seven axially aligned lenses including, in the order of the entrant light beam:
    negative meniscus first and second lenses of forward convexity;
    a positive third lens;
    a bi-convex fourth lens;
    a bi-concave fifth lens; and
    positive sixth and seventh lenses; and
wherein axial air space between said third lens and said fourth lens is larger than the axial thickness of said third lens, said third lens having a diameter larger than the fourth lens.

2. A retrofocus wide angle objective lens system according to claim 1, wherein said third lens of positive power has a front surface convex to the front.

3. A retrofocus wide angle objective lens system according to claim 2, wherein said seventh lens is a positive meniscus lens of rearward convexity.

4. A retrofocus wide angle objective lens system according to claim 3, wherein said fifth lens has an axial thickness smaller than the axial air space between said fifth and sixth lenses.

5. A retrofocus wide angle objective lens system according to claim 1, wherein
   a. $0.6 < d_6/d_4 < 1.0$
   b. $0.68f < \gamma_4 < 0.9f$
   c. $7.0f < |\gamma_6|$
   d. $N_3 > 1.72; V_3 < 40$ e. $0.95f < |\gamma_8| < 1.5f; \gamma_8 < 0$ wherein $f$ is the overall focal length of the complete objective lens system; $d_4$ and $d_6$ are the axial air separations between said second and third lenses and between said third and fourth lenses respectively; $\gamma_4$, $\gamma_6$ and $\gamma_8$ are the radii of curvature of the rear refracting surfaces of said second, third and fourth lenses respectively; and $N_3$ and $V_3$ are the refractive index and Abbe number of a glass respectively from which said third lens is made.

6. A retrofocus wide angle objective lens system having the following characteristics of the various lens elements thereof with their spatial relationships from each other as related to a focal length of unity:

| | | f = 1; F 2.8; ω = 38° | | | | |
|---|---|---|---|---|---|---|
| Surface radius | | Axial thickness and separation | Refractive index | | Abbe number | |
| $\gamma_1 =$ | 1.1726 | $d_1 =$ 0.0632 | $N_1 =$ | 1.61117 | $\nu_1 =$ | 55.9 |
| $\gamma_2$ | 0.5675 | $d_2$ 0.2290 | | | | |
| $\gamma_3$ | 1.9078 | $d_3$ 0.0526 | $N_2$ | 1.56965 | $\nu_2$ | 49.4 |
| $\gamma_4$ | 0.6840 | $d_4$ 0.1909 | | | | |
| $\gamma_5$ | 1.8065 | $d_5$ 0.1053 | $N_3$ | 1.74950 | $\nu_3$ | 35.2 |
| $\gamma_6$ | 13.2025 | $d_6$ 0.1510 | | | | |
| $\gamma_7$ | 1.1998 | $d_7$ 0.4009 | $N_4$ | 1.71300 | $\nu_4$ | 53.9 |
| $\gamma_8$ | −1.3263 | $d_8$ 0.2315 | | | | |
| $\gamma_9$ | −0.7066 | $d_9$ 0.0351 | $N_5$ | 1.76182 | $\nu_5$ | 26.6 |
| $\gamma_{10}$ | 1.7226 | $d_{10}$ 0.0386 | | | | |
| $\gamma_{11}$ | −3.0411 | $d_{11}$ 0.1088 | $N_6$ | 1.7725 | $\nu_6$ | 49.7 |
| $\gamma_{12}$ | −0.6435 | $d_{12}$ 0.0070 | | | | |
| $\gamma_{13}$ | −4.6120 | $d_{13}$ 0.0912 | $N_7$ | 1.7725 | $\nu_7$ | 49.7 |
| $\gamma_{14}$ | −1.2212 | | | | | |

$\Sigma d = 1.7050$ Back focal length = 1.2807

$$\frac{d_6}{d_4} = 0.7910$$

7. A retrofocus wide angle objective lens system having the following characteristics of the various lens elements thereof with their spatial relationships from each other as related to a focal length of unity:

| | | f = 1 F 2.8 ω = 38° | | | | |
|---|---|---|---|---|---|---|
| Surface radius | | Axial thickness and separation | Refractive index | | Abbe number | |
| $\gamma_1 =$ | 1.3064 | $d_1 =$ 0.0632 | $N_1 =$ | 1.61117 | $\nu_1 =$ | 55.9 |
| $\gamma_2$ | 0.6109 | $d_2$ 0.3152 | | | | |
| $\gamma_3$ | 3.7622 | $d_3$ 0.0526 | $N_2$ | 1.60729 | $\nu_2$ | 49.3 |
| $\gamma_4$ | 0.7757 | $d_4$ 0.2100 | | | | |
| $\gamma_5$ | 1.7619 | $d_5$ 0.1053 | $N_3$ | 1.72342 | $\nu_3$ | 38.0 |
| $\gamma_6$ | −9.1853 | $d_6$ 0.1500 | | | | |
| $\gamma_7$ | 1.0840 | $d_7$ 0.3627 | $N_4$ | 1.60311 | $\nu_4$ | 60.7 |
| $\gamma_8$ | −1.3336 | $d_8$ 0.2910 | | | | |
| $\gamma_9$ | −0.6365 | $d_9$ 0.0351 | $N_5$ | 1.74077 | $\nu_5$ | 27.8 |
| $\gamma_{10}$ | 1.8877 | $d_{10}$ 0.0491 | | | | |
| $\gamma_{11}$ | −2.5630 | $d_{11}$ 0.0947 | $N_6$ | 1.69350 | $\nu_6$ | 53.3 |
| $\gamma_{12}$ | −0.6112 | $d_{12}$ 0.0070 | | | | |
| $\gamma_{13}$ | −26.827 | $d_{13}$ 0.0912 | $N_7$ | 1.69350 | $\nu_7$ | 53.3 |
| $\gamma_{14}$ | −1.1736 | | | | | |

$\Sigma d = 1.8271$ Back focal length = 1.2807

$$\frac{d_6}{d_4} = 0.714$$

8. A retrofocus wide angle objective lens system having the following characteristics of the various lens elements thereof with their spatial relationships from each other as related to a focal length of unity:

| | | f = 1 F 2.8 ω = 37° | | | | |
|---|---|---|---|---|---|---|
| Surface radius | | Axial thickness and separation | Refractive index | | Abbe number | |
| $\gamma_1 =$ | 1.1756 | $d_1 =$ 0.0421 | $N_1 =$ | 1.61117 | $\nu_1 =$ | 55.9 |
| $\gamma_2$ | 0.5588 | $d_2$ 0.2132 | | | | |
| $\gamma_3$ | 1.9760 | $d_3$ 0.0351 | $N_2$ | 1.56965 | $\nu_2$ | 49.4 |
| $\gamma_4$ | 0.6857 | $d_4$ 0.1855 | | | | |
| $\gamma_5$ | 1.8555 | $d_5$ 0.1053 | $N_3$ | 1.83400 | $\nu_3$ | 37.2 |
| $\gamma_6$ | 19.7733 | $d_6$ 0.1810 | | | | |
| $\gamma_7$ | 1.2309 | $d_7$ 0.3879 | $N_4$ | 1.71300 | $\nu_4$ | 53.9 |
| $\gamma_8$ | −1.3096 | $d_8$ 0.2258 | | | | |
| $\gamma_9$ | −0.7213 | $d_9$ 0.0351 | $N_5$ | 1.76182 | $\nu_5$ | 26.6 |
| $\gamma_{10}$ | 1.6736 | $d_{10}$ 0.0421 | | | | |
| $\gamma_{11}$ | 2.7127 | $d_{11}$ 0.0877 | $N_6$ | 1.77250 | $\nu_6$ | 49.7 |
| $\gamma_{12}$ | −0.6361 | $d_{12}$ 0.0070 | | | | |
| $\gamma_{13}$ | −3.6831 | $d_{13}$ 0.0877 | $N_7$ | 1.77250 | $\nu_7$ | 49.7 |
| $\gamma_{14}$ | −1.1511 | | | | | |

$\Sigma d = 1.6355$ Back focal length = 1.2807

$$\frac{d_6}{d_4} = 0.9757$$

* * * * *